Figure 11:
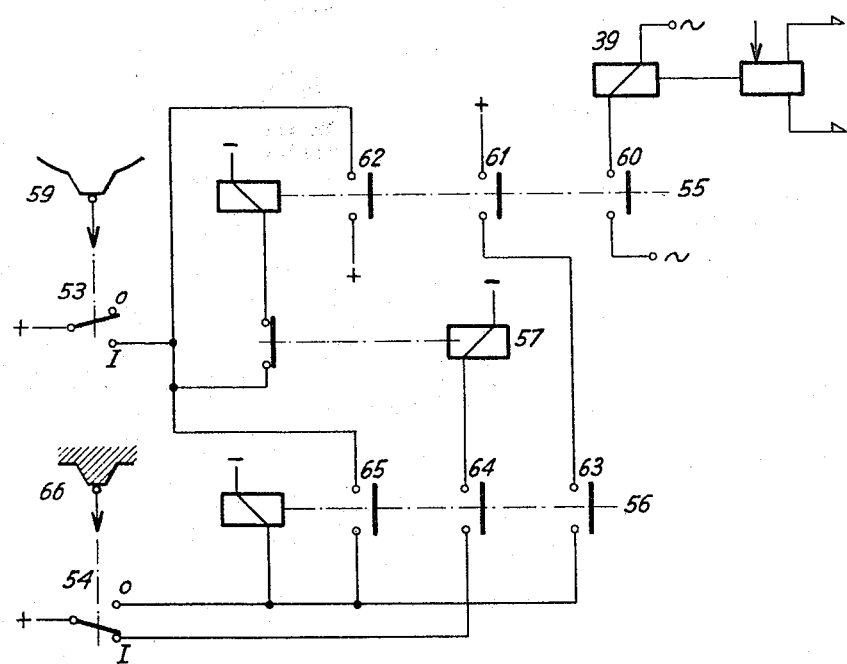

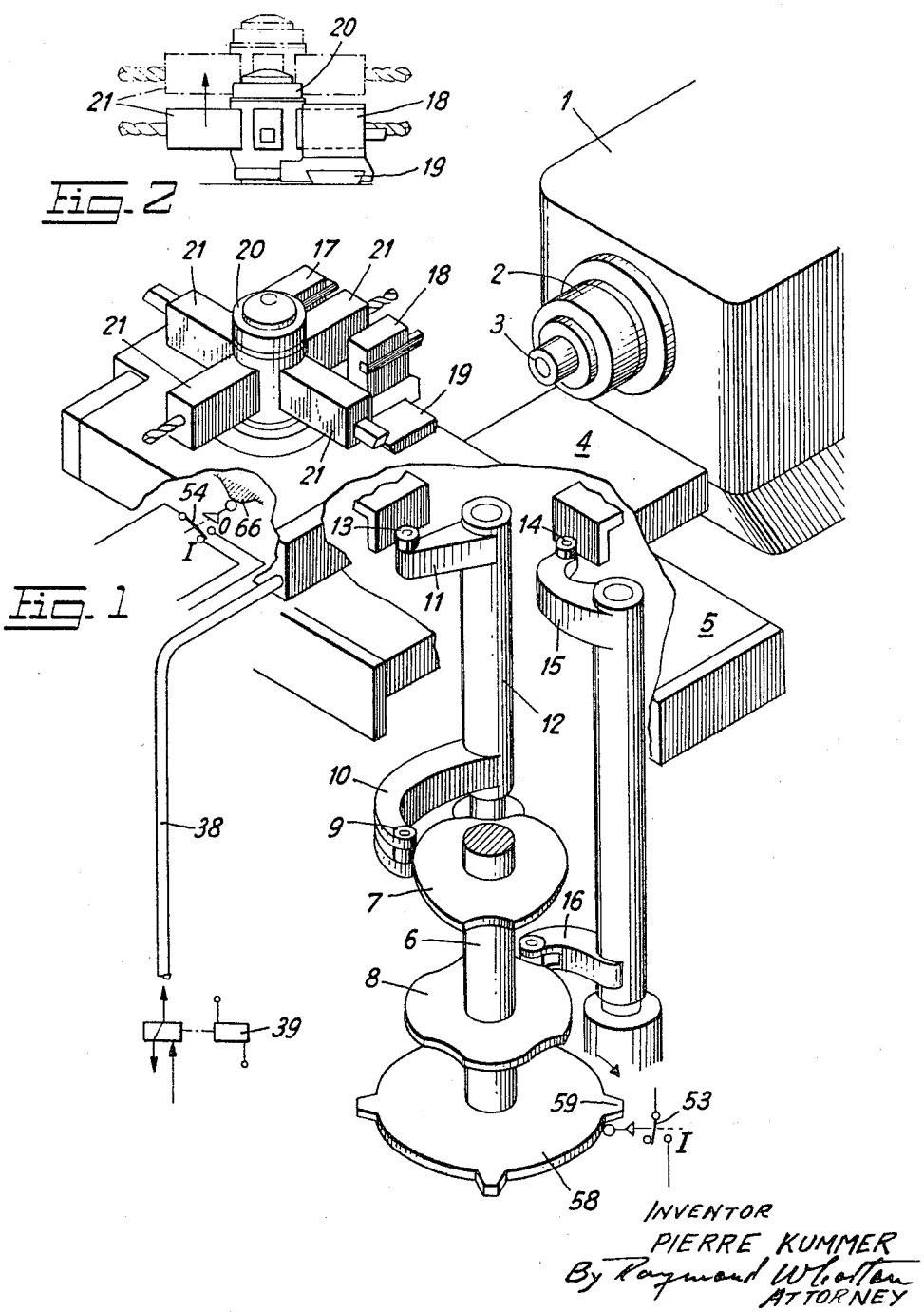

Nov. 29, 1966 P. KUMMER 3,287,792
AUTOMATIC CYCLE LATHE
Filed May 8, 1964 4 Sheets-Sheet 2
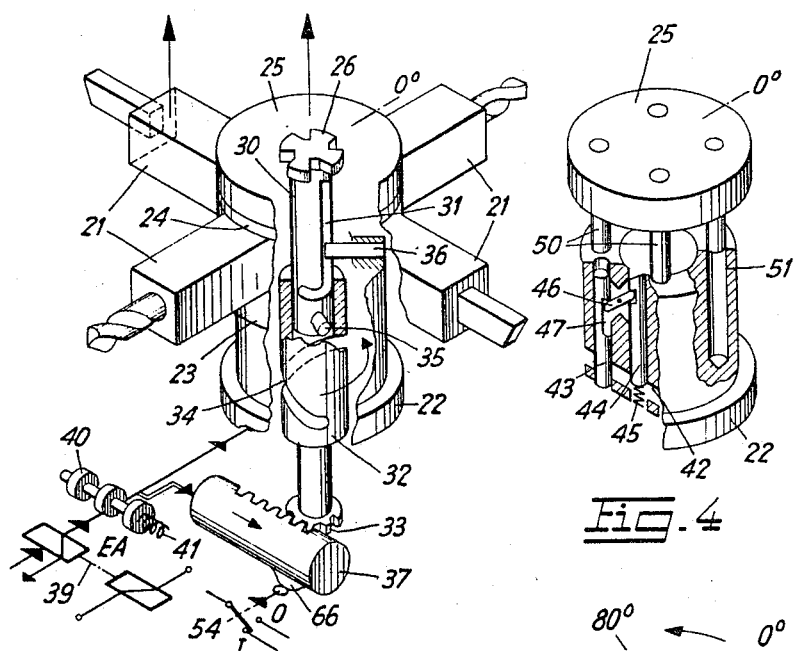
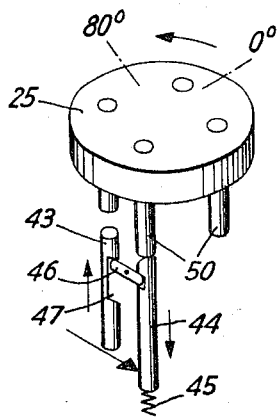
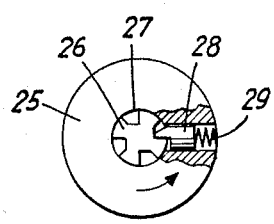
INVENTOR
PIERRE KUMMER
By Raymond W Wootten
ATTORNEY

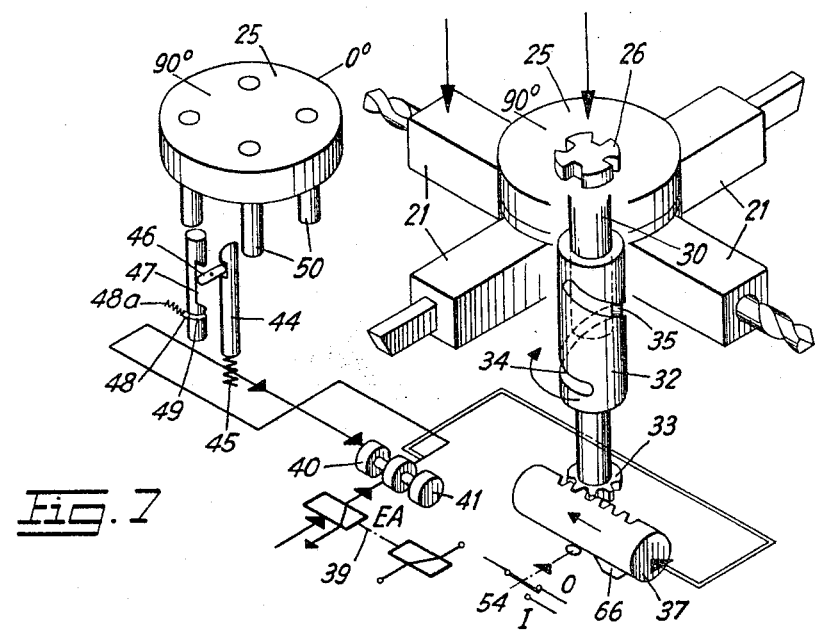
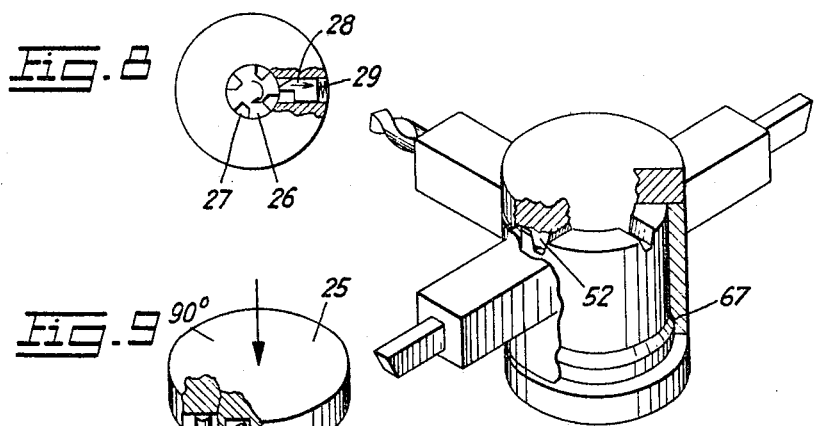
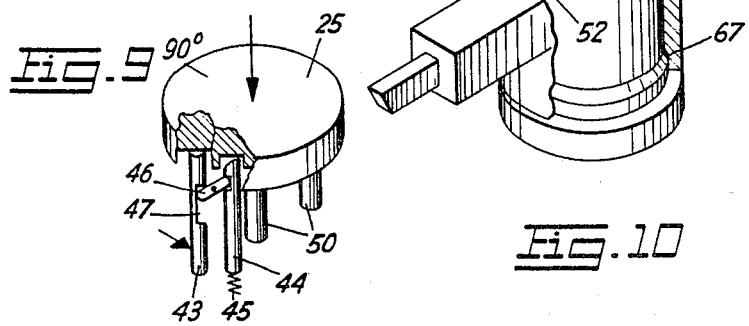

United States Patent Office 3,287,792
Patented Nov. 29, 1966

3,287,792
AUTOMATIC CYCLE LATHE
Pierre Kummer, Tramelan, Switzerland, assignor to Kummer Frères S.A., Fabrique de Machines, Tramelan, Bern, Switzerland
Filed May 8, 1964, Ser. No. 365,935
Claims priority, application Switzerland, May 10, 1963, 5,889/63
5 Claims. (Cl. 29—54)

The present invention relates to improvements in automatic cyle lathes comprising a tailstock destined to receive the work engaged in rotation, and two crossed slides situated before the tailstock and controlled by cams.

Known lathes of this type permit the machining of work held in the tailstock by means of tools of simple form and mounted in fixed positions on the top slide. By simultaneously displacing the two slides, the tools may be brought simultaneously or successively into engagement with the work and thus make possible a great variety of machining operations.

As the movements of the two slides are controlled by two cams only, these lathes may be started in a relatively simple and rapid way. Moreover, these lathes permit carrying out precise machining operations since the relative positions of the tools are fixed and the latter are rigidly held in place on the upper slide.

These known lathes, however, are in certain cases of limited use only. It may prove difficult or even impossible, for example, to dispose the tools on the upper slide in such manner as to allow of effecting in a single cycle the desired number of machining operations, since the tools interfere with each other. Such difficulty may arise in particular when machining certain pieces of relatively large diameter which require several operations by means of different tools in the vicinity of the work axis.

Automatic cycle lathes are known, on the other hand, wherein the tool post comprises two cross-slides and, on the upper slide, a rotatable turret that carries the tools. Such turret may comprise up to eight tool holders which will successively assume their working positions during the operating cycle. However, since the turret is rotatably mounted on the upper slide, the tools carried thereby are not maintained in their working positions with as much precision and rigidity as the tools chucked in tool holders that are clamped directly to the upper slide. Although the precision of the turret is generally sufficient for rough-machining and perforating for example, such precision proves insufficient in certain cases for finishing operations, such as finish-boring a hole perforated in a preceding operation.

The object of the present invention is to remedy said drawbacks and to provide a lathe of the type mentioned which permits attainment of maximum precision while at the same time offering more possibilities of use than known lathes of the same type. To such end the upper slide of the present lathe is adapted to receive several fixed tool holders clamped thereto in working positions on both sides of a definite intermediate position, and equipped with at least two movable tool holders which will successively occupy said intermediate position during the cycle.

One form of the invention is shown in the drawings, in which FIG. 1 is a fragmentary and schematic perspective view illustrating the invention; FIG. 2 is a side elevation, on a smaller scale, of a portion of FIG. 1; FIG. 3 is a perspective schematic view partially in section, of certain components of the structure in an operating position; FIG. 4 is a view similar to that of FIG. 3 showing certain parts not visible in FIG. 3; FIG. 5 is a top plan view of FIG. 3, partially in section; FIG. 6 is a schematic perspective view of certain elements of FIG. 4 in another working position; FIG. 7 is a schematic perspective and exploded view of certain elements of FIGS. 3 and 4 in a third working position; FIG. 8 is a plan view similar to FIG. 5, depicting another working position; FIG. 9 is a schematic perspective view of elements of FIGS 4 and 6 in a fourth working position; FIG. 10 is a schematic perspective view of certain elements of FIG. 3 in a fourth working position; and FIG. 11 is an electric wiring diagram.

In a tailstock 1 (FIG. 1) is pivoted a spindle 2 that carries a chuck in which is clamped a workpiece 3. In front of tailstock 1 is situated a tool support which comprises a first or longitudinal slide 4 mounted on the lathe bed (not shown) and movable along the axis of tailstock 1. This first slide carries a cross-slide 5 movable at right angles to the axis of tailstock 1. The movements of these two slides are controlled, in known manner, through a camshaft 6 by means of two cams 7, 8 keyed to said shaft 6. A first follower 9 mounted on the free end of a rocker arm 10 engages cam 7 and carries with it an arm or lever 11; arms 10, 11 being intergral with a shaft or pivot 12. Arm 11 carries on its free end a stop dog 13 that engages cross slide 5 and displaces same against the action of a spring (not shown). In a similar fashion, a stop dog 14 mounted on the free end of an arm 15 in conjunction with a rocker arm 16 control slide 4 under the influence of the cam 8.

On cross-slide 5 are mounted fixed tool holders 17, 18 each of which carries a tool, and these tool holders are adjustable on a dovetail rail 19. Behind these tool holders and between same is mounted a turret 20 which carries four tool holders 21 spaced 90° from each other. These tool holders form arms of a cross, one of which extends between the tool holders 17, 18. As illustrated, two of the tool holders 21 carry drills, and the other two carry cutter tools. Each of these tools is intended to carry out a machining operation on the workpiece 3 in a sequence determined by the shape of the cams 7, 8.

The spacing between the tool holder 21 situated between the tool holders 17, 18 and is so adjusted that each tool can work without being fouled by the others. In order to locate the tool holders 21 successively between the tool holders 17 and 18, turret 20 is raised, swung through 90° and lowered again.

To such end turret 20 is vertically movable. It is mounted on a base 22 (FIG. 3) fixed to slide 5 and comprises a cylindrical body 23 to which are fixed the tool holders 21, an intermediate plate 24 and an upper disc 25 which are fixed to each other. The turret proper (23 to 25) is slidable on base 22 and pivotable with respect to the latter. To enable turret 20 to automatically carry out the required movements, it is equipped with a control mechanism which now will be described. This mechanism comprises a ratchet wheel 26 that is lodged in a circular opening 27, as shown in FIG. 5, of upper disc 25. A catch 28 lodged in an opening of disc 25 and radially shiftable under the action of a spring 29, presents a nose that is engaged between the teeth or projections of ratchet wheel 26 and couples the turret (23 to 25) to the wheel 26 when the latter turns counterclockwise (FIG. 5), the turret being uncoupled when wheel 26 turns clockwise, as seen in FIG. 8.

Wheel 26 is fixed to the upper end of a stem 30 in which is provided a vertical groove 31 that ends in its lower portion by a horizontal portion extending peripherally of the stem 30 for at least a quarter of its circumference. Shaft 30 is partially engaged in a sleeve 32 lodged in base 22 and carrying at its lower end a pinion 33. Sleeve 32 is provided with a helical slot 34 in which is engaged a stud 35 that is fixed to and extends radially from the lower portion of stem 30. Slot 34 ends at its lower portion in a horizontal segment of short length (FIG. 3). Base 22 carries a radially fixed pin 36 that extends radially from the base 22 into the groove 31. When sleeve 32 is engaged in counterclockwise rotation (FIG. 3) stem 30 is held fixed against rotation by pin 36, and the stem 30 rises in sleeve 32 until the pin 36 arrives at the lower end of groove 31. At this moment, while rotation of the sleeve 32 continues, the stem 30 is turned through 90° without any change in its axial position. A movement of the sleeve 32 in the opposite direction causes inverse displacement of the stem 30.

Pinion 33 is engaged with a rack 37 in the form of a piston that is actuable in either direction along its axis by compressed air supplied to the turret 20 through a hose 38, shown in FIG. 1, which is controlled by an electrically operated slide valve 39. Compressed air circulates in conduits provided in the base 22. At the inlet of said conduits (FIG. 3) is disposed a distributor slide 40 that is biased by a spring 41. From the outlet of the distributor slide 40 there are three conduits, one of which leads to one end of the piston 37, another of which leads to the other end of the piston 37 as appears in FIG. 7, and the third of which leads to the end of the distributor slide 40 opposite the spring 41, after having entered a section of a conduit 42, as shown in FIG. 4, that is closable by two plungers 43, 44 which will be described below. When the conduit 42 is open, air forces the slide 40 to the right against the action of the spring 41. When the slide 40 is in the position shown in FIG. 3, it shuts off the conduit ending at the right-hand end of piston 37; and it shuts off the conduit ending at the left-hand piston-end and opens the remaining conduit when it is displaced to the right (FIG. 7).

The plungers 43, 44 are movable in vertical bores of the base 22 (FIG. 4). Plunger 44 is situated downstream from plunger 43 and is pushed upwardly by a spring 45. It actuates a pivotal arm 46 of which one end is engaged in an alongated recess 47 of plunger 43. When comparing FIGS. 4, 6 and 7 it is seen that when plunger 43 is in its lower position and plunger 44 in its upper position, plunger 43 will be raised when plunger 44 is depressed against the action of spring 45, but that plunger 43 then stays in its upper position under the action of a ball 48, as shown in FIG. 7, that is biased by a spring 48a and engaged in a groove 49 even when the plunger 44 returns to its upper position. Conduit 42 then is open.

Disc 25 carries four studs 50 of equal lengths and spaced 90° from each other. When the turret 20 is in its upper position and moves through 90°, one of the four studs 50 engages the upper end of the plunger 44 which is provided with an inclined surface, and the engaging stud pushes this plunger downwardly. In return, when the turret 20 is in its lower position in any of its four possible orientations, the studs 50 are engaged in the bores 51 of the base 22 that are shifted with respect to the plungers 43, 44. The lower face of the disc 25 then rests on the plunger 43 and maintains the plunger in the lower position, while plunger 44 will have its upper end received in a corresponding recess of the disc 25 and will remain in its upper position.

As seen from FIG. 10, radial ribs 52 of trapezoidal shape are provided on the lower portion of disc 25, in engagement with corresponding grooves of the base 22 to ensure guidance of the turret 20 and the return thereof to a predetermined orientation after each pivotal movement thereof.

To ensure proper sequence of the operations which permit the turret to pass from one station to the following station, the control mechanism comprises two electrical contactors 53, 54 (FIGS. 1, 3, and 11, and three relays 55 to 57 (FIG. 11). Contactor 53 ensures the proper functioning of the operations. It is actuated by a cam 58 mounted on cam shaft 6 and comprising four lobes 59. In the position of engagement (I) cam 58 energizes the coil of relay 55 when the sole contact of relay 57 is closed, which required the coil of relay 57 to be de-energized.

Contactor 54 ensures the return of the components of the control mechanism to their initial positions. In one of the latter (zero) contactor 54 causes the coil of relay 56 to be energized, while in the other position (I) contactor 54 can energize the coil of relay 57, provided that relay 56 has been switched on. While relay 57 comprises only one contact, each of the relays 55, 56 comprises three contacts. One contact 60 of relay 55 controls the slide valve 39, and two other contacts 61, 62 serve as holding contacts, the first for the coil of relay 56 and the second for the coil of relay 55. As to the contacts 63 to 65 of relay 56, the first is a holder contact series-connected to contact 61, the second is a control contact for the coil of relay 57, and the third is a holder contact. Contactor 54 is actuated by a boss 66 of piston 37. When the latter is in its position of rest (FIG. 3) the contactor is maintained in the switch-on position (I) but as soon as this piston is displaced, contactor 54 will be switched off.

To describe the functions of the control mechanism, it will be appropriate to begin from the position shown in FIG. 1. Cams 7, 8 have actuated the two slides 4, 5 and the drill in the working position has completed its operation. At this moment one of the lobes 59 actuates contactor 53. As piston 37 is at rest, contactor 54 is in the switch-on position, but as relay 56 has been switched off, relay 57 is de-energized so that when contactor 53 is switched on, relay 55 is actuated and then holds itself in the switch-on position, thanks to contact 62. Slide valve 39 opens, and compressed air flowing into hose 38 and through slide 40 arrives at the left end of piston 37. Under the action of the air pressure, this piston starts to move and rotates the pinion 33 and sleeve 32 whereby the turret (23 to 25) is raised, as has been said before.

At the moment, when piston 37 has been displaced a few millimeters, contactor 54 moves to the switch-off position whereby relay 56 is energized and switched-on. The coil of relay 57 is not put in circuit as contactor 54 has passed to a position of disconnection; the contacts 63, 65 however, ensure connection of relay 55 even when lobe 59 overrides contactor 53 and the latter returns to its switch-off position.

As indicated above, at the moment when turret 20, under the action of piston 37, has arrived in its upper position, raised by stem 30, the turret is engaged to rotate by said stem thanks to catch 28. After a partial revolution of about 80°, one of the studs 50 abuts against the inclined plane of plunger 44 and depresses same. This plunger then starts to close conduit 42 while it raises plunger 43. Such plunger inversion is accomplished without opening conduit 42 at any moment. Compressed air thus still is prevented from flowing down conduit 42 until the stud 50 that engages plunger 44 is displaced beyond the latter. At that moment (FIG. 7) the partial revolution of turret 20 attains 90° and plunger 44 is set free. The latter under the action of spring 45 returns to its upper position. Since plunger 43 is also maintained in its upper position by ball 48, conduit 42 is open and the air pressure starts to act against the left end of slide 40 which then is displaced and compresses spring 41. Such displacement directs the air toward the right-hand face of piston 37 which thereby is moved to the left (FIG. 7) and takes pinion 33 with it in a movement inverse to the foregoing. Such displacement of sleeve 34 in clockwise rotation entrains first stem 30 in rotation until the pin 36 has arrived at the foot of the vertical portion of groove 31, but such partial revolution is effected without taking along the turret, as catch 28 is pushed back (FIG. 8). The movement of sleeve 32 then entrains a descending movement of stem 30 which draws turret 20 downwardly. The studs 50 are engaged in the bores 51, and the ribs 52 are engaged in their corresponding grooves.

At the end of this vertical descending movement, the underside of disc 25 pushes back plunger 43 into conduit 42 which cancels the air pressure on slide 40 and permits the latter to return to its initial position. At the same time, however, boss 66 returns contactor 54 to the switch-on position. Contact 64 of relay 56 being closed, relay 57 is energized and its contact opens. Relay 55 is switched off whereby slide valve 39 is closed and relay 56 is disconnected. As contact 64 of the latter is now open again, the circuit of the coil of relay 57 is interrupted and the contact thereof returns to its normal position so that the device is ready to operate again as soon as the succeeding ear 59 starts to act upon contactor 53.

After sleeve 32 has returned turret 20 to its lower position, stud 35 is engaged in the horizontal portion of slot 34 and blocks the turret in the vertical sense. The ribs 52 as well as a frusto-conical guide surface 67 ensure the rigidity of the turret position.

Thanks to the control device described, the turret may be equipped with a maximum number of different tools and may be positioned between two tools fixed to the cross-slide.

The lathe capacity is thus augmented without need for lengthening the slides or increasing their number. The two fixed tools carried by the cross-slide may be destined to machine the lateral face of the work, while all the tools carried by the turret operate in the work axis or in the vicinity thereof to machine the internal portions of the end face. The displacements of the cross-slide are thus reduced to a minimum value.

I claim:

1. In an automatic cycle lathe of the type comprising a tailstock destined to receive a work engaged in rotation, and two crossed slides positioned in front of the tailstock and controlled through cams, the improvement defined in that the upper of said two slides is adapted to receive a plurality of fixed tool holders subjected to said upper slide in working positions disposed on both sides of a definite intermediate position, and that said upper slide is equipped with a plurality of movable tool holders adapted to successively occupy said intermediate position during the cycle.

2. In a lathe as set out in claim 1 the further improvement defined by the fact that the movable tool holders are integral with a commutable revolver means pivoted to the upper slide.

3. A lathe as set out in claim 2 in which the revolver means is a turret having a vertical axis and being carried by a base that is integral with the upper slide, said turret being axially displaceable to allow the movable tool holders to pass above the fixed tool holders at the time of commutation.

4. A lathe as set out in claim 1 in which the wedging elements integral with the upper slide ensure locking the movable tool holders in the intermediate position.

5. A lathe as set forth in claim 4 in which said wedging elements comprise on one hand a frusto-conical span presented by the turrent base to its lower portion and on the oher hand radial grooves of trapezoidal cross-section provided on the upper portion of the base, the turret presenting corresponding wedge elements engaging those of the base in each of the positions for which a movable tool holder occupies said intermediate position.

No References Cited.

RICHARD H. EANES, JR., *Primary Examiner.*